Figure 1:
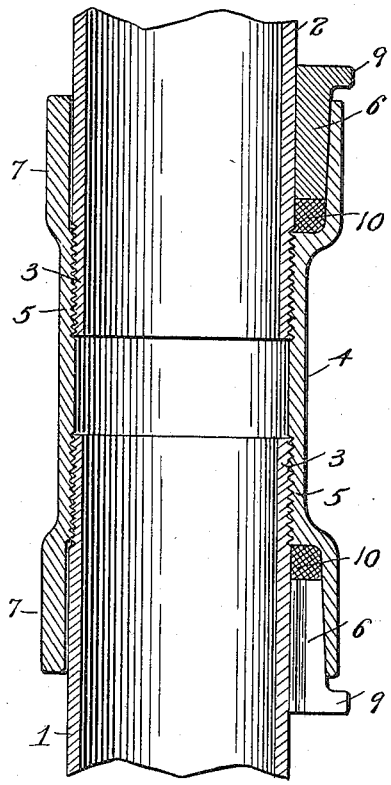

J. KENNY.
PIPE COUPLING.
APPLICATION FILED NOV. 28, 1911.

1,148,324.

Patented July 27, 1915.

Witnesses:
Inventor:
John Kenny
by his Attys:

UNITED STATES PATENT OFFICE.

JOHN KENNY, OF BROOKLYN, NEW YORK, ASSIGNOR OF ONE-HALF TO JOHN SIMMONS COMPANY, A CORPORATION OF NEW YORK.

PIPE-COUPLING.

1,148,324.　　　　Specification of Letters Patent.　　Patented July 27, 1915.

Application filed November 28, 1911. Serial No. 662,790.

*To all whom it may concern:*

Be it known that I, JOHN KENNY, a citizen of the United States, residing at Brooklyn, county of Kings, and State of New York, have invented certain new and useful Improvements in Pipe-Couplings, fully described and represented in the following specification and the accompanying drawings, forming a part of the same.

This invention relates to certain improvements in pipe couplings.

Pipes for water, gas, oil, etc., are generally made in lengths or sections having screw threaded ends. In the assembling of these sections the screw threaded proximate ends of two pipe sections are united by couplings of a character to provide a tight joint, the threaded ends of the sections being screwed into the couplings which are provided with a threaded portion to receive the pipe ends. Such pipes are usually buried in the ground, and a great deal of trouble has been experienced, especially where the ground is soft or marshy, or where the earth has fallen away from the pipes and let sections of the pipes settle and become displaced. Trouble has also been experienced where the pipes are laid in side streets in close proximity to water or steam mains by sections of the pipe being raised or displaced because of breaks in the water or steam mains. This displacement of the pipes causes the pipe sections to break off, usually just at the end of the threaded portions. This break usually occurs, furthermore, just outside the ends of the couplings, ruining the pipes. Even where the break comes in the coupling, a leaky joint is formed. These breaks in the pipes, whether above or below ground, are frequently caused by sudden variations of pressure in the fluid, either gaseous or liquid, passing through the pipes. A large number of coupling devices have been designed for remedying this trouble which are open to various objections, most of them being so expensive to make that they can not be used, and, for this and other reasons, they have not gone into use.

It has been proposed to overcome the trouble and at the same time to produce a coupling which is cheap enough to permit of its use by providing a fitting having a socket or recess at each end and tapping through this socket bolt holes in which bolts are screwed at right angles to the run of the pipe, the bolts being screwed tightly against the pipe walls and the socket then being packed around the bolts with lead or other soft metal. This construction has, however, these disadvantages: If the bolts are screwed tight enough against the walls of the pipe to relieve strain on the pipe ends, the threads of the pipe ends and the coupling have a tendency to become separated and make a leaky joint. Furthermore, the bolt ends are liable to rust off in the coupling, and in many instances it happens that the bolts are not screwed into the coupling sufficiently to perform their function. To remedy these defects as far as possible a packing of soft metal, such as lead, has been employed. This, in addition to being expensive, has the disadvantage that unless the lead is packed carefully the threads of the pipe ends are apt to spread away from the threads of the coupling and form a leaky joint. Further, even if the coupling is suitably packed with the soft metal, such metal is compressible and due to vibrations from sudden variations of pressure in the pipes, and for other reasons, tends to fall away or become disengaged from the walls of the pipe, necessitating repacking. The packing and repacking requires considerable time, if properly done, and makes the assembling of the pipes slow, which is an item of considerable importance.

It is the object of the present invention to provide an improved coupling or joint for pipes, including in the term pipes, fittings, elbows, T's, Y's, etc., by which a tight joint shall be provided, and which shall act to relieve strain or tension on the joint ends of the pipes and prevent them from breaking off, and to produce a coupling which can be made cheaply enough to permit of its general use, which shall be simple and in few parts and thus easily assembled, and which, when assembled, will be permanent.

An improved coupling for effecting these desired results is illustrated in the accompanying drawings, in which—

Figure 2:
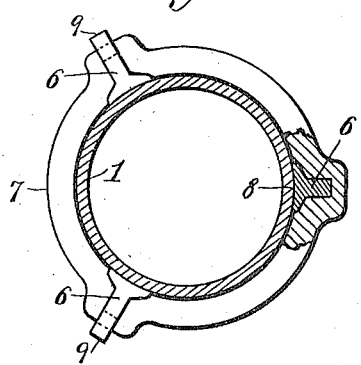

Figure 1 is a view, partly in section and partly broken away, of two straight pipe lengths or sections united by the improved coupling, and Fig. 2 is a plan view, partly in section, of a coupling applied to the pipe.

Referring now to these drawings, the improved coupling is shown as uniting two sections of straight length pipe, though it will be understood that the invention may be employed in other relations and with other fittings.

The pipe sections are indicated by the numerals 1, 2, and may be provided at their ends with the usual exteriorly threaded portions 3 which are adapted to be screwed into and be united by the coupling which is indicated by the numeral 4.

In the preferred form of coupling, and as illustrated in the drawing, the coupling 4 is provided with a central, interiorly threaded, portion 5, the threads of which coöperate with the threads on the pipe when the pipe ends are screwed into the coupling to form a tight joint.

In constructions embodying the invention, there are provided tension relieving members whose function is to relieve the strain on the threaded ends of the pipe sections, these members being so constructed and arranged as to contact with and have a substantial bearing engagement with the walls of the pipe sections from a point at or near the threaded ends and extending along the pipe walls a sufficient distance to relieve strains and prevent the pipes from breaking off. In the best constructions, furthermore, these tension relieving members will be of such a character as to provide for small variations in the diameter of the pipe sections, so that both the members themselves and the pipes can be used as cast, thus avoiding the necessity of machining. In the particular construction illustrated, these tension relieving members are in the form of wedges 6, a plurality of these wedges being provided, disposed at suitable intervals around the pipe and parallel with the rim thereof. The wedges may be secured in the coupling so as to have a bearing engagement with the pipe ends in various ways.

In the preferred construction and as shown the coupling is cast at each end with an enlarged or thickened portion 7 in which is formed a plurality of key seats, three such seats being shown in the construction illustrated. These seats are disposed at suitable intervals around the thickened end of the coupling which, except for the seats, is in close contact with the walls of the pipe, thus making a very strong and cheap construction.

The keys or wedges 6 have a bearing engagement with the walls of the pipe, and are formed with a bearing surface slightly curved, as indicated at 8, in Fig. 2, whereby when driven into the seats they have a close bearing engagement with the walls of the pipe and relieve strains thereon. If desired, the outer ends of the wedges or keys 6 may be provided with a lip 9, by which they can be knocked out, if it is desired to dismantle the coupling. If desired, a small amount of lead packing 10 or other soft metal may be run into the key seat, against which the wedges are driven. This packing is not essential, however, and may be omitted when desired.

By the present invention a very cheap, and at the same time efficient, coupling for the purpose desired is produced, and one in which the disadvantages above pointed out attending other couplings now in use are to a large extent eliminated.

The invention is not limited to the precise form of coupling and tension relieving wedges shown and described. It is obvious that certain variations may be made both in the form of the coupling and in the form of the wedges and the invention is not to be restricted to the precise forms illustrated.

What is claimed is:

1. The combination with two pipe sections having their proximate ends threaded, of a coupling sleeve independent of the pipes having an interiorly threaded portion into which the ends of the two pipe sections are screwed, a plurality of key seats extending throughout their length parallel with the run of the pipes formed in the coupling member beyond the threaded portion at each end, and a plurality of independent wedge-shaped keys positioned in the seats against lateral displacement by driving them in the seats parallel with the run of the pipe, said keys being in bearing engagement with the walls of the pipe sections beyond the threaded portion and acting by themselves to relieve the strain on the threaded portion of the pipe sections.

2. The combination with two pipe sections having their proximate ends threaded, of a coupling sleeve having an interiorly threaded portion into which the ends of two pipe sections are threaded, a plurality of independent key seats spaced from each other formed in the coupling sleeve at each end beyond the threaded portion thereof, a plurality of wedge shaped keys held in the seats against lateral displacement and spaced from each other when in position and having bearing engagement with the walls of the pipe sections beyond the threaded portion and acting by themselves to relieve the strain on the threaded portions of the pipe sections, and a projection on the keys whereby they may be knocked out of position.

In testimony whereof, I have hereunto set my hand, in the presence of two subscribing witnesses.

JOHN KENNY.

Witnesses:
P. B. PHILIPP,
T. F. NEHOE.